Patented Jan. 7, 1930

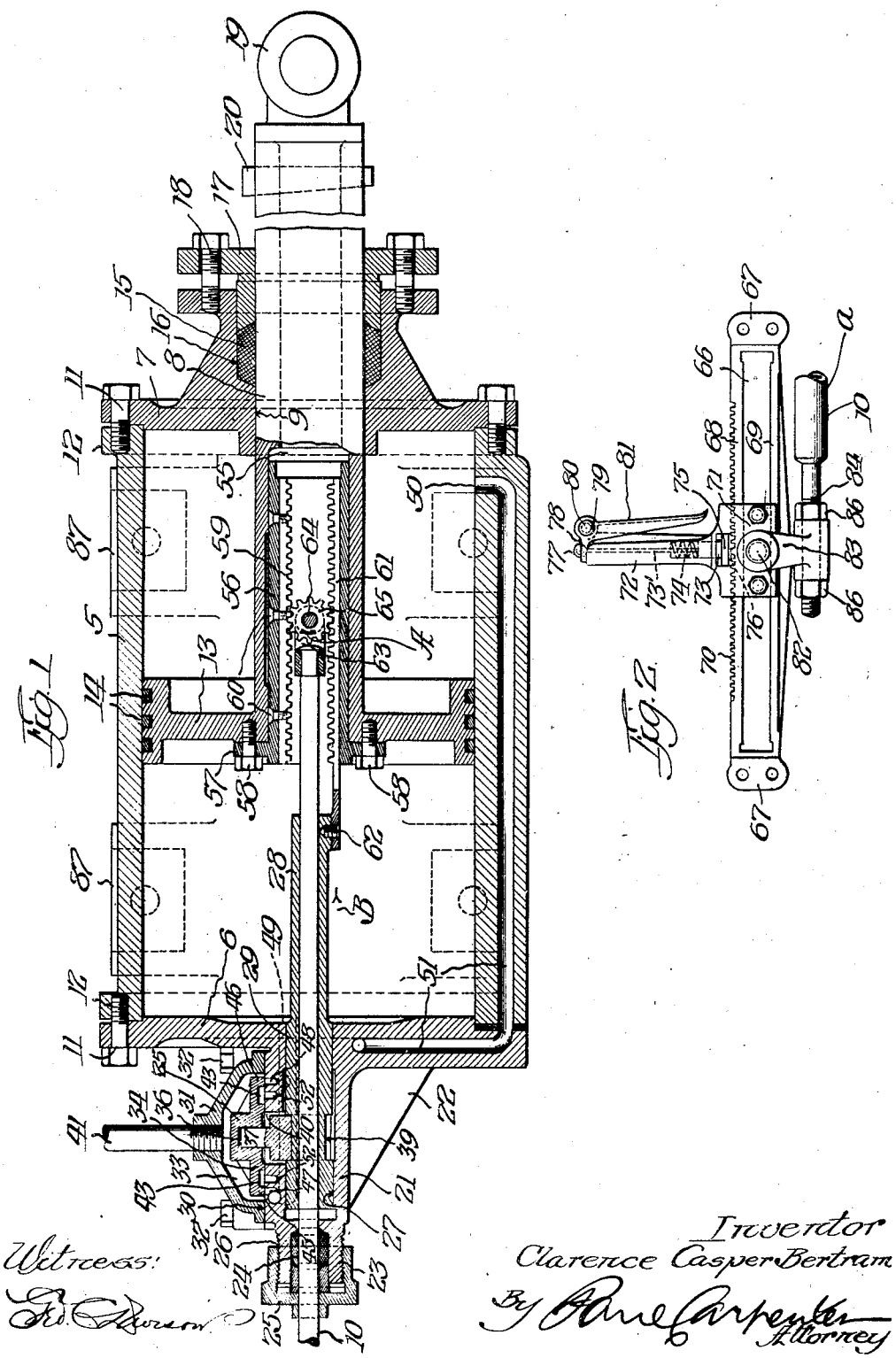

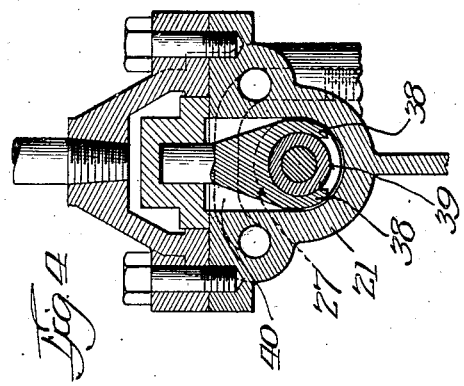
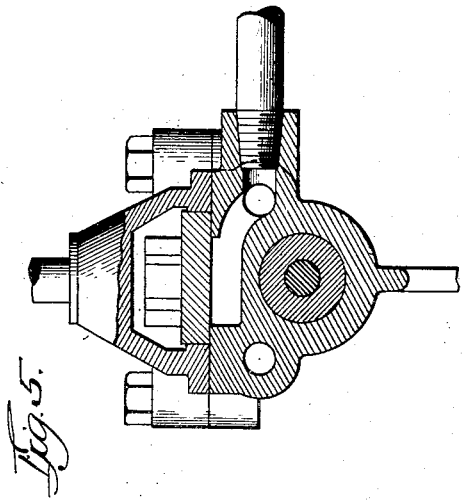
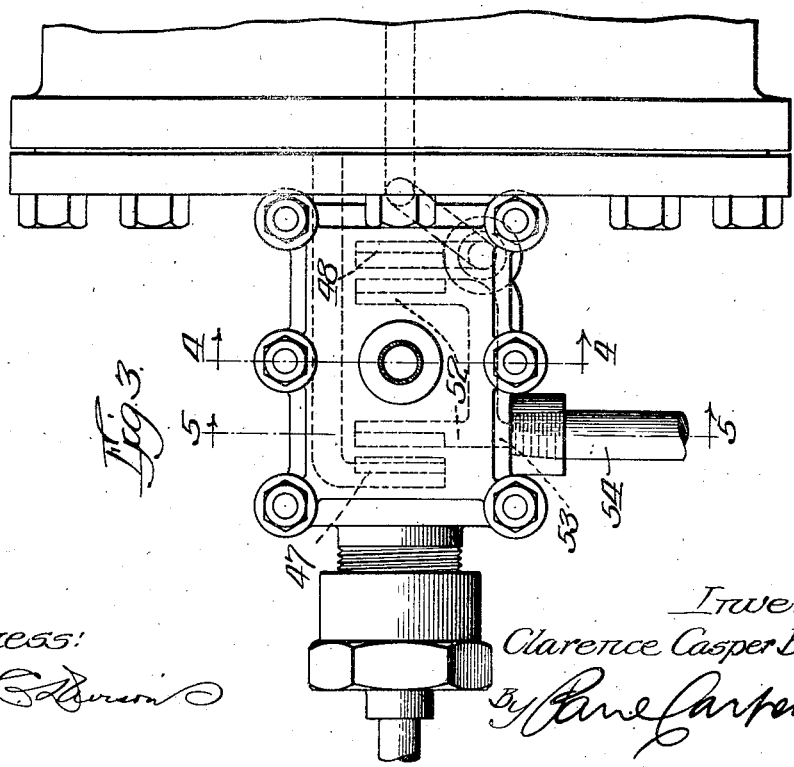

1,742,946

UNITED STATES PATENT OFFICE

CLARENCE CASPER BERTRAM, OF CHICAGO, ILLINOIS, ASSIGNOR TO BARCO MANUFACTURING COMPANY, OF CHICAGO, ILLINOIS, A CORPORATION OF ILLINOIS

REVERSING-GEAR MECHANISM

Application filed May 13, 1922. Serial No. 560,606.

This invention relates to motion imparting devices, and more particularly pertains to an improved form of power operated reverse gear for locomotive engines and the like.

While, for the purpose of convenience in describing, this invention is illustrated as a power reverse gear for steam locomotives, it will be obvious that it finds a wide field of utility for other purposes.

The principal objects and features which characterize this invention reside in: the provision of improved means for transmitting motion in one of two opposite directions through prescribed limits under the application of fluid pressure; the provision of improved means for imparting and controlling motion under the application of manual and fluid pressures; the provision of improved means for imparting rectilinear motion through the application of fluid pressure; the provision of improved means for reversing the valve mechanism of a steam locomotive engine; the provision of improved means embodying manually and fluid pressure operated mechanisms for reversing the valve mechanism of a steam locomotive engine; the provision of improved means for reversing and for varying the cut-off of a steam locomotive engine, either manually or under independent power or both; the provision of improved means for controlling the cut-off and for reversing the valve mechanism of a steam locomotive engine by the application of fluid pressure; the provision of improved means for manually controlling the application of fluid pressure for varying the cut-off and for reversing the valve mechanism of a steam locomotive engine; the provision of improved means for manually adjusting the position of an element to be moved, and for applying and controlling independent pressure for aiding in the manual adjustment of the device; and the provision of improved means whereby the required adjustment of the valves of a steam engine may be accomplished with a minimum of physical effort on the part of the operator yet with absolute safety and precision.

As further characterizing this invention are: improved means for developing rectilinear motion, both of the elements to be moved, and the manual and other control mechanism thereof, so as to avoid pivot points and eliminate mechanical faults; the provision of a manually controlled fluid pressure operated motion imparting device wherein the manual adjustment or movement is coincident with and mechanically aided by an independent source of power; and the provision of a device possessing the foregoing features which is simple in construction, efficient in operation, and capable of universal application on steam locomotives for controlling the valve mechanisms thereof.

Still further objects and more specific features characterizing this invention are: the provision of improved valve operating mechanism for controlling application of fluid pressure; improved mechanism for actuating the valve by a manually controlled step-by-step motion in the same direction as that being taken by the valve, and the embodiment of these features in a unit structure.

The foregoing and such other objects and features as may appear or be pointed out as this description proceeds are attained in one structural embodiment, for example, that illustrated in the accompanying drawings, in which:

Figure 1 is a longitudinal sectional view of the power operated reverse gear;

Figure 2 is an elevational view of the manual control means therefor;

Figure 3 is an enlarged fragmentary plan view of the valve casing;

Figure 4 is a vertical transverse sectional view taken on the line 4—4 of Figure 3 looking in the direction of the arrows; and Figure 5 is a view similar to Figure 4 taken on the line 5—5 of Figure 3 looking in the direction of the arrows.

Referring more particularly to the drawings, 5 is a cylinder provided with cylinder heads 6 and 7, a piston rod 8 operating in opening 9 in the head 7, and a control rod 10 operating in the cylinder head 6. The cylinder heads 6 and 7 are retained on the opposite ends of the cylinder 5 by means of bolts 11 which extend through the heads into threaded openings provided in the end flanges 12—12.

The piston rod 8 constitutes the motion imparting means and is rectilinearly movable in the cylinder 5, the inner end of said rod having integrally formed therewith a piston 13 provided with the conventional packing rings 14. The piston rod 8 is made hollow for a purpose which will presently appear and slides through a packing 15 held in an enlargement 16 of the opening 9, by means of a gland 17, which latter is retained by a series of bolts 18. The piston rod 8 projects beyond the packing and its gasket and has secured in the outer end thereof a bearing eye 19 by means of a transverse key 20.

The cylinder head 6 is provided with an extension 21, preferably, though not necessarily integral with the head, said extension being strengthened by a web 22 and supporting a cup 23 which latter is axial to the cylinder and contains therein a packing 24 surrounding the control rod 10, said packing being secured by packing nut 25 threaded at 26 to the external surface of the cup 23.

The extension 21 forms the bottom of the control valve casing and is provided with a longitudinal bore 27 concentric with the axis of the cylinder, a sleeve 28 surrounding the rod 10 and having an enlarged portion 29 lying within the bore 27. The top surface of the extension 21 is preferably flat, as indicated at 30, and a valve housing or cover section 31 is placed thereon and retained in position by bolts 32. The cover section 31 affords a chamber or chest 33 in which is longitudinally slidable a valve 34, in the present instance shown as taking the form of the well-known D-type, the under surface of the valve seating snugly on the surface 30. The intermediate portion of the valve is provided with an enlargement 35, recessed at 36 to receive a pin 37, said pin having integral curved arms 38—38 depending therefrom, which arms encircle the reduced portion 39 of the enlargement 29, these arms 38 fitting relatively snugly in the recess 39 so as to prevent relative movement between the sleeve and the valve. The top of the extension 21 is provided with an elongated opening 40 accommodating the pin 37 and its arms, and the portion of the extension 21 on either side of the opening 40 is provided with the ports controlled by the valve 34. A source of fluid pressure, such as steam or air, is introduced into the chamber 33 through a conduit 41.

The valve 34 is provided with recesses 43 in the undersurface thereof and near the ends of the valve, the solid end portions 45 and 46 being of sufficient thickness to cover the intake-ports 47 and 48, respectively, when the valve is in the neutral or lap position as shown in Figure 1. The port 47 discharges, at 49, through the cylinder head 6 into the cylinder 5, and the port 48 is connected at 50 near the other end of the cylinder, through a duct 51. Exhaust ports 52—52 communicate by a common duct 53 (best shown in Figure 3) with an exhaust conduit 54. As shown in Figure 3, the ports 47, 48 and 52 are elongated and of sufficient distance apart to be completely bridged by one or the other of the recesses 43 in the valve when the latter is in the proper position. From the foregoing it will be seen that the valve is of a reciprocating D-type having outside admission so that no resilient retaining means for keeping the valve on its seat is absolutely necessary because the pressure being in the chamber 33 normally tends to seat the valve and thus prevent leakage.

In order to move the piston 13, motion is imparted to the valve 34 for admitting fluid under pressure to either end of the cylinder 5, and to the desired purpose there is provided a manually or otherwise operated control means for moving the valve, description of which follows. The piston rod 8, as previously pointed out, is hollow and is provided with an enlarged bore 55 which opens at the inner end of the rod to receive a tubular supporting element 56, one end of said tube projecting beyond the piston 13 and having an annular flange 57 thereon, whereby the tube may be secured to the piston by means of bolts 58—58, which pass through the flange 57 into the piston 13. The tube 56 is provided with and serves to support fixedly a rack 59, screws 60—60 passing through the the tube and into the rack for retaining same. The tubular support 56 also serves to support and guide a second rack 61, which latter is longitudinally movable relative the tube and disposed oppositely to the rack 59, the rack 61 extending beyond the tube and being connected by a screw 62 to one side of the inner end of the sleeve 28. The control element, which may be the short reach rod, extends through the sleeve 28 and is provided with a bifurcated bearing 63 carrying a transverse shaft 64, on which is mounted a pinion 65, said pinion being in permanent meshing engagement with both of the racks 59 and 61.

I provide an improved manually operable means for reciprocating the short reach rod 10, this rod being connected to the manual operating means to be described presently, the manual means being located within the cab of the locomotive. The manual operating means and means for setting the device at a desired position comprises a crosshead guide 66 provided with end foot portions 67—67, by which the same may be fixedly secured in the locomotive cab adjacent the engineer's position. The crosshead guide preferably comprises two spaced bars 68 and 69, the upper bar 68 having a series of rack teeth 70 in the top face thereof. A crosshead 71 is slidable between the bars of the crosshead guide and is provided with an upstanding handle 72 having a plunger 73 therein, said plunger being maintained in the lowermost position by a coil spring impinging upon same, and said plunger carrying a block 75 provided with a series of teeth 76 for engagement with the teeth 70. The plunger rod 73 extends up through the top of the handle and is formed with an eye 77 seating in one portion 78 of a bell-crank lever 79, which latter is pivoted at 80 to the handle 72. The other portion 81 of the bell-crank lever forms a grip which lies normally at an angle to said handle 72, and when the handle is grasped said lever is swung toward the handle thus raising the teeth 76 out of engagement with the teeth 70 and permitting movement of the crosshead. Connection is made between the crosshead 71 and the rod 10 by a pin 82, which extends laterally from the crosshead, and a link member 83 which engages said pin. A reduced threaded portion 84 of the short-reach rod 10 passes through the lower part of the link 83, a pair of nuts 86 being disposed on either side of the link member on said threaded portion 84 for facilitating adjustment of the reach-rod relative to said link member when setting the device upon installation.

In the installation of the device on the usual type of steam locomotive, the cylinder 5 is mounted by means of the foot pieces 87—87 on a convenient part of the framework of the locomotive, usually on the so-called running board, forward of the cab, the pivot member 19 being connected by a suitable bolt or the like, not shown, to the conventional long-reach rod, not shown, this long-reach rod usually extending to the valve mechanism and being connected to the reverse shaft lever. The short-reach rod 10 extends through the front end of the cab of the locomotive, the crosshead guide 66 being mounted on some suitable part of the boiler or at any other point convenient to the engineer's position. In this mounting of the device, it will be seen that the short-reach rod, cylinder, manual control element, and piston rod are all in substantially axial alinement, thus avoiding any fulcrum points which might cause vibration or loose coupling of one sort or another.

As shown in Figure 1, the parts are in a balanced or neutral position, the valve 34 being in the lap position. Assuming that it is desired to move the valve mechanism of the locomotive into forward running position, the handle 72 is grasped and the latch for same released. The handle 72 and the block 71 are then moved to the right in Figure 2, which, for the sake of convenience, is here assumed to be toward the forward end of the device, which movement of the block 71 slides the short-reach rod 10 toward the right-hand end of the cylinder 5, as seen in Figure 1. The piston 13 and piston rod 8 being stationary, this forward movement of the short-reach rod will cause the pinion 65 carried thereby to be rotated in the direction of the arrow A, due to the fact that the rack 59 is stationary and said pinion is engaged therewith. The movement of the pinion causes the rack 61 and the sleeve 28 to be moved in the direction of the arrow B in Figure 1, resulting in an exposure of the port 47 and admission of fluid under pressure thereto from the chamber 33. Fluid is simultaneously exhausted from the opposite end of the cylinder through duct 51, port 48, and exhaust pipe 54.

The pressure fluid enters the rear or left-hand end of the cylinder as seen in Figure 1, and imparts motion in a forward direction to the piston 13. As the valve 34 abuts the forward end of the casing 31, the rod 10 is stopped. As the cylinder responds to the pressure exerted thereon and moves in a forwardly direction, thus shifting the locomotive valve mechanism into forward running position, the pinion 65 is again rotated, but in an opposite direction to that indicated by the arrow A. This is accomplished by holding the handle or releasing the latch for locking same, thereby causing the piston to stop at its limit of movement determined by the position of the handle. This movement of the pinion acts upon the rack 61 to reverse the valve and move the same into lap position, it being impossible for the valve to move farther than lap position because immediately the fluid pressure is cut off from the rear end of the cylinder the piston ceases to move and consequently no more motion is imparted to the valve. When the valve is moved to the right, the port 48 is exposed to communication with the exhaust port 52, but when the valve goes back to lap position the port 48 is also closed so that there is substantially an equilization or balancing of pressure on either side of the piston to assist in preventing its accidental movement. Assuming that it is desired to move the piston more than one step, or rather to cause its continuous motion in the desired direction, the operator may continue the motion of the piston to its uttermost limit by imparting a continuous motion to the handle 72, the friction of the valve keeping it open and thus continuing the motion of the piston. This substantially continuous motion is imparted to the piston because as long as the shaft 64 is kept moving rectilinearly the device will automatically pick up and move practically continuously in one direction, the operator following through. To move the piston in the opposite direction, regardless of its position in the cylinder, the movement of the handle 72 is merely reversed, and the cylinder returned step-by-step or, if desired, continuously to the neutral or latched position and then, if desired, continued to the reverse position. It will, of course, be understood that when the device is operated to reverse the locomotive valve mechanism, the operation is identical with that for the forward running positions, with the exception that the port 48 is exposed and admits fluid pressure to the right-hand end of the cylinder, thus reversing the direction of the movement of the piston therein. Thus the device is in full control of the operator, and while the device is operated entirely independently of any great physical effort on the part of the operator, the device is extremely sensitive to the control. It will be observed that when the device is in the position shown in Figures 1 and 2, it being understood that in position on a locomotive the reach rod 10 is continuous, the locomotive valve gear is also in the neutral or lap position so that no steam can reach the cylinders and the locomotive is practically locked against running away.

Especial emphasis is placed upon the alinement of the reach-rod, valve mechanism, and the piston and cylinder, this arrangement eliminating all fulcrums and making a tighter gear, at the same time insuring safety and rendering more convenient to the engineer the adjustment of the valve mechanism of the locomotive. It will be observed that the usual practice in handling a locomotive may be followed through with this reverse gear and that the handle 72 is moved forwardly for running the engine forward and backwardly for running the engine backward, so that there can be no confusion to the engineer as to the running positions of the device. Furthermore, the degree of step-by-step adjustment permitted is only limited by the length of the stroke of the valve 34, that is, with a short-stroke valve as shown each step of movement of the piston will be a very small portion of the full motion in either direction of the locomotive valve gear. Furthermore, the continuous movement is only limited by the degree of motion of the manual control means. Thus the engineer is enabled to change the travel of the valves of the engine at will, so that when starting a longer stroke may be given to the valve and more steam admitted and as speed is increased the valve gear may be "latched up" so as to shorten the cut-off.

Having thus described my invention and illustrated its use, what I claim as new and desire to secure by Letters Patent is:—

1. In a device of the character described, in combination, reciprocating motion imparting means, means for actuating said motion imparting means, manually operable controlling means coaxially related to and arranged within and guided by said motion imparting means for the actuating means for manually changing the relation of the latter to the motion imparting means, and means operated by the motion imparting means for returning the actuating means to normal relation thereto and for locking said motion imparting means.

2. In a device of the character described, in combination, an element to be moved, means for imparting movement to said element, means for applying fluid pressure to said movement imparting means, means for manually controlling the application fluid pressure upon said element, and gearing arranged within and operated by the movement of said element to be moved for arresting the application of fluid pressure.

3. In a power reverse mechanism, the combination of a cylinder, a piston adapted to reciprocate within the said cylinder, a piston rod fixed to the said piston, a valve adapted to effect a change in pressure within the said cylinder, and manual means for actuating the valve including locking parts provided with teeth and adapted to prevent any substantial movement or permit a movement of the said piston within the said cylinder, the said teeth of the said locking parts being adapted to engage with each other by a rotating movement of one of the said parts.

4. In a reverse gear mechanism, a cylinder having a piston therein, a pair of relatively movable racks carried by said piston one of which is fixed thereto, a valve for controlling fluid pressure to said cylinder and connected to one of said racks, and manually operated means connecting both of said racks, said manually operated means extending through said cylinder.

5. In a reverse gear mechanism, a cylinder having a piston therein, a pair of relatively movable racks carried by said piston, one of which is fixed thereto, a valve for controlling fluid pressure to said cylinder and connected to one of said racks, and manually operated means connecting both of said racks, said manually operated means extending into said cylinder, and into said valve.

6. In a reverse gear mechanism, a cylinder having a piston therein, a pair of relatively movable racks carried by said piston one of which is fixed thereto, a valve for controlling fluid pressure to said cylinder and connected to one of said racks, manually operated means including a pinion connecting said racks and a connecting rod extending into said cylinder.

7. In a reverse gear mechanism, a cylinder having a piston therein provided with a hollow piston rod, a valve for controlling flow of fluid under pressure to said cylinder, a valve stem provided with a rack lying in said piston rod, a rack fixed to and movable with said rod, and manually operable means for the valve including a pinion connecting said racks.

8. In a device of the character described, in combination, an element to be moved in response to fluid under pressure, a valve for controlling the application of fluid under pressure to said element to be moved, means for operating said valve including a pair of relatively movable racks both supported and guided by the element to be moved, and one of which is connected to said valve and the other to said element to be moved, and manually operable means having operative connection to said racks for imparting movement to one of same to cause movement of said valve in one direction.

9. In a device of the character described, in combination, an element to be moved in response to fluid under pressure, a valve for controlling the application of fluid under pressure to said element to be moved, means for operating said valve including a pair of relatively movable racks both supported and guided by the element to be moved, and one of which is connected to said valve and the other to said element to be moved, the other of said racks being operated by said element to be moved, and manually operable means having operative connection to said racks for imparting movement to one of same to cause movement of said valve in one direction, movement of the element to be moved imparting movement to the valve in the opposite direction.

10. In a device of the character described, in combination, an element to be moved in response to fluid under pressure, and having a recess therein, a valve for controlling the application of fluid under pressure to said element to be moved, means for operating said valve including a pair of relatively movable racks both supported by the element to be moved, and located in said recess, and one of which is connected to said valve, and the other to said element to be moved, and manually operable means having operative connection in said recess to said racks for imparting movement to one of same to cause movement of said valve in one direction.

11. In a device of the character described, in combination, a cylinder, a piston movable in said cylinder, a valve for controlling flow of fluid to said cylinder, means for moving said valve, a piston rod for said piston, a valve stem extending into said piston rod within said cylinder, and rack and pinion mechanism within said cylinder having a part connected to said piston rod forming a connection between said piston rod and valve stem for imparting motion to said valve independently of said valve moving means.

12. In a device of the character described, in combination, a cylinder, a piston operable in said cylinder and having a piston rod, a valve and manual operating means therefor for controlling flow of fluid to said cylinder, and a connected rack and pinion mechanism located in the cylinder having a part connected to the piston rod for connecting said valve and manual operating means to the piston, and said manual operating means being externally of the cylinder.

13. In a device of the character described, in combination, a cylinder, a piston operable in said cylinder and having a piston rod, a valve and manual operating means therefor for controlling flow of fluid of said cylinder, and a connected rack and pinion mechanism located in the cylinder having a part connected to the piston rod for connecting said valve and manual operating means to the piston, said piston, rack and pinion, valve and manual operating means being all disposed for movement on substantially the same longitudinal axis.

14. In a device of the character described, in combination, a cylinder, a piston operable in said cylinder and having a piston rod, a valve and manual operating means therefor for controlling flow of fluid to said cylinder, and a connected rack and pinion mechanism located in the cylinder having a part connected to the piston rod for connecting said valve and manual operating means to the piston, said manual means being connected to said pinion for imparting movement thereto, and to said valve, and said valve being connected to said rack.

15. In a device of the character described, in combination, a cylinder, a piston operable in said cylinder and having a piston rod, a valve and manual operating means therefor for controlling flow of fluid to said cylinder, a rack connected to said valve and a rack carried by and disposed within said piston rod, and a pinion connected to said racks and receiving motion in one direction from said manual operating means for moving the valve.

16. In a device of the character described, in combination, a cylinder, a piston operable in said cylinder and having a piston rod, a valve and manual operating means therefor for controlling flow of fluid to said cylinder, a rack connected to said valve and a rack fixedly carried by said piston, and a pinion connected to said racks and receiving motion in one direction from said manual operating means for moving the valve, said piston, racks, valve, pinion and manual operating means being jointly displaceable along substantially the same rectilinear plane and arranged within the cylinder.

17. In a device of the character described, in combination, a cylinder, a piston operable in said cylinder and having a piston rod, a valve and manual operating means therefor for controlling flow of fluid to said cylinder, a rack connected to said valve and a rack fixedly carried by said piston, and a pinion connected to said racks and receiving motion in one direction from said manual operating means for moving the valve, said piston, racks, valve, pinion and manual operating means being arranged within the piston rod and jointly displaceable along substantially the same rectilinear plane, and in the same direction.

18. In a device of the character described, in combination, a cylinder, a piston operable in said cylinder and having a piston rod, a valve and manual operating means therefor for controlling flow of fluid to said cylinder, said piston rod having a recess and a pair of racks arranged in said recess one of which is connected to said valve and the other of which is connected to said piston rod, and a pinion operated by said manual means and disposed adjacent to said piston and operatively connected to both of said racks, and a connected rack and pinion located in the cylinder for connecting said valve and manual operating means to the piston, and said manual operating means being externally of the cylinder.

19. In a device of the character described, in combination, an element to be moved in response to fluid under pressure, a valve for controlling the application of fluid under pressure to said element to be moved, means for operating said valve including a pair of relatively movable racks both supported and guided by the element to be moved, and one of which is connected to said valve, and the other of which is connected to the element to be moved and manually operable means having operative connection to said racks for imparting movement to one of same to cause movement of said valve in one direction, all of said elements to be moved, valve, racks and manual operating means being arranged for movement in the same direction in a common plane.

20. In a reverse gear operating mechanism, a piston operable in a cylinder to actuate the reverse gear, a valve for controlling flow of fluid under pressure to move said piston, a pair of relatively movable racks in said cylinder one of which is actuated by the piston, a connection in said cylinder between said racks and a manually operable member, and the other of said racks being connected to said valve to produce a movement thereof alternately by said manual means and by said piston for controlling flow of fluid under pressure to the latter.

21. In a reverse gear operating mechanism, in combination, a piston movable in response to fluid under pressure, a valve for controlling such fluid under pressure, and manually operable means for actuating said valve, including two relatively movable racks, one of which is connected to and supported by and the other of which is guided by said piston, for effecting the movement of said valve and thereby application of fluid under pressure to said piston in predetermined increments.

22. In a device of the character described, in combination, a cylinder, a piston, fluid passageways leading to said cylinder, a reciprocating valve for controlling fluid under pressure in said passageways to effect movement of said piston, manually actuated means for operating said valve to open the same, and means for resetting the valve to lap position including a pair of racks and a pinion within said cylinder and supported by said piston and interconnecting the piston, valve, and said manual means.

23. In a device of the character described, in combination, a cylinder, a piston, fluid passageways leading to said cylinder, a reciprocating valve for controlling fluid under pressure in said passageways to effect movement of said piston, said piston having a hollow piston rod, manually actuated means extending into said cylinder for operating said valve to open the same, and means for resetting the valve to lap position including a pair of racks and a pinion supported for interconnection to said valve, piston and manual means arranged in said hollow piston rod.

24. In a device of the character described, in combination, cylinder, a piston operable in said cylinder, a valve structure mounted at one end of said cylinder in axial alinement with said piston and including a movable valve member, a rack carried by and moving with said piston in said cylinder, a second rack arranged in said cylinder and connected to impart movement to said valve member, a pinion operatively connecting said racks, and a manually operated member lying axially within said cylinder and supporting said pinion whereby movement thereto will serve to actuate said valve member to admit fluid to move said piston which in turn will act through said first named rack and said pinion to return the valve to lap position.

25. In a device of the character described, in combination, a cylinder, a piston operable in said cylinder and having a hollow piston rod, a valve structure mounted at one end of said cylinder in axial alinement with said piston and including a movable valve member, a rack fixedly mounted in said hollow piston rod in said cylinder, a second rack arranged in said hollow piston rod and connected to impart movement to said valve member, a pinion operatively connecting said racks lying in said hollow piston rod, and a manually operated member lying axially within said cylinder extending into said piston rod and supporting said pinion whereby movement thereto will serve to actuate said valve member to admit fluid to move said piston which in turn will act through said first named rack and said pinion to return the valve to lap position.

In testimony whereof I have hereunto signed my name.

CLARENCE CASPER BERTRAM.